United States Patent
Kim et al.

(10) Patent No.: US 9,077,179 B2
(45) Date of Patent: Jul. 7, 2015

(54) SYSTEM FOR RECOGNIZING TYPE OF BATTERY MANAGEMENT SYSTEM AND CHARACTERISTICS OF BATTERY CELL

(75) Inventors: Bong-Young Kim, Yongin-si (KR); Myung-Sup Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 381 days.

(21) Appl. No.: 13/589,039

(22) Filed: Aug. 17, 2012

(65) Prior Publication Data

US 2013/0113429 A1     May 9, 2013

(51) Int. Cl.
H02J 7/00     (2006.01)

(52) U.S. Cl.
CPC ............... *H02J 7/00* (2013.01); *H02J 7/0004* (2013.01); *H02J 7/0008* (2013.01); *H02J 7/0029* (2013.01); *H02J 7/0031* (2013.01); H02J 2007/0001 (2013.01)

(58) Field of Classification Search
CPC ......... H02J 7/00; H02J 7/0004; H02J 7/0008; H02J 7/0029; H02J 7/0031; H02J 2007/0001
See application file for complete search history.

(56) References Cited

U.S. PATENT DOCUMENTS

| | | | |
|---|---|---|---|
| 5,608,306 A * | 3/1997 | Rybeck et al. | 320/106 |
| 6,605,922 B2 * | 8/2003 | Tamai et al. | 320/106 |
| 6,867,595 B2 * | 3/2005 | Chen | 324/433 |
| 7,250,612 B2 * | 7/2007 | Pai-Paranjape et al. | 250/461.1 |
| 7,486,045 B2 * | 2/2009 | Yamaguchi et al. | 320/106 |
| 7,554,288 B2 * | 6/2009 | Gangstoe et al. | 320/107 |
| 7,732,072 B2 | 6/2010 | Han | |
| 7,751,994 B2 * | 7/2010 | Matsumura et al. | 702/63 |
| 7,843,164 B2 * | 11/2010 | Hara et al. | 320/106 |
| 7,877,815 B2 * | 1/2011 | Yoo et al. | 726/34 |
| 7,948,208 B2 * | 5/2011 | Partovi et al. | 320/108 |
| 2007/0279002 A1 * | 12/2007 | Partovi | 320/115 |
| 2008/0056495 A1 * | 3/2008 | Eguchi et al. | 380/270 |
| 2009/0096413 A1 * | 4/2009 | Partovi et al. | 320/108 |
| 2013/0110887 A1 * | 5/2013 | Pan | 707/821 |

FOREIGN PATENT DOCUMENTS

| | | |
|---|---|---|
| KR | 10-1998-021359 | 7/1998 |
| KR | 10-0561298 | 3/2006 |
| KR | 10-2006-0123949 | 12/2006 |
| KR | 10-2011-0006510 | 1/2011 |

* cited by examiner

*Primary Examiner* — Naum B Levin
(74) *Attorney, Agent, or Firm* — Christie, Parker & Hale, LLP (57) ABSTRACT

A battery pack includes a battery module including a battery cell and configured to perform a first identification function for enabling a device outside the battery module to recognize characteristics of the battery cell, and a battery management system for controlling operations of the battery cell and configured to perform a second identification function for enabling a device outside the battery management system to recognize a type of the battery management system.

18 Claims, 6 Drawing Sheets

SYSTEM FOR RECOGNIZING TYPE OF BATTERY MANAGEMENT SYSTEM AND CHARACTERISTICS OF BATTERY CELL

CROSS-REFERENCE TO RELATED APPLICATION

This application claims priority to and the benefit of Korean Patent Application No. 10-2011-0114503, filed on Nov. 4, 2011, in the Korean Intellectual Property Office, the disclosure of which is incorporated herein in its entirety by reference.

BACKGROUND

1. Field

One or more embodiments of the present invention relate to a battery pack, a battery management system, and a battery system.

2. Description of Related Art

As portable electronic devices, such as mobile phones, digital cameras, and laptops, are widely used, batteries for supplying power to operate the portable electronic devices are being actively developed.

A battery may be provided in a form of a battery pack including a battery cell and a protection circuit including a battery management system for controlling charging and discharging of the battery cell. In the battery pack, the battery cell or protection circuit may malfunction during a charging or discharging process, and thus, the protection circuit includes various devices to stably control the charging and discharging of the battery cell.

SUMMARY

One or more embodiments of the present invention include a battery pack capable of selectively replacing a battery cell and a battery management system, a battery management system, and/or a battery system.

Additional aspects of embodiments of the present invention will be set forth in part in the description which follows and, in part, will be apparent from the description, or may be learned by practice of the presented embodiments.

According to one or more embodiments of the present invention, a battery pack includes a battery module including a battery cell and configured to perform a first identification function for enabling a device outside the battery module to recognize characteristics of the battery cell, and a battery management system for controlling operations of the battery cell and configured to perform a second identification function for enabling a device outside the battery management system to recognize a type of the battery management system.

The battery management system may be configured to recognize the characteristics of the battery cell by using the first identification function of the battery module.

The battery module may further include an identifying unit configured to perform the first identification function.

The identifying unit may be a memory for recording a state of the battery cell.

The battery management system may be configured to reset data about a previous battery module when the battery module is installed.

The battery management system may be configured to update the state of the battery cell recorded by the memory.

Whether battery cells are connectable to the battery management system may be determined according to their characteristics and according to the type of the battery management system.

The device outside the battery module may be electrically coupled to the battery pack.

According to one or more embodiments of the present invention, a battery management system for controlling operations of a battery module includes a battery cell, wherein the battery management system is configured to perform an identification function for enabling an external device to which the battery management system is coupled to recognize a type of the battery management system.

The battery management system may further include an identifying unit for performing the identification function and for communicating with the external device.

The battery management system may be detachable from the battery module.

Whether the battery module is connectable to the battery management system may be determined according to its characteristics.

The battery management system may further include a recognizing unit for recognizing the characteristics of the battery module.

According to one or more embodiments of the present invention, a battery system includes a battery module including a battery cell, a battery management system for controlling operations of the battery cell, and a host for identifying a type of the battery management system by being coupled to the battery management system.

Whether the battery management system is connectable to the host may be determined according to the type of the battery management system and according to a type of the host.

The host may be configured to identify a type of the battery module by being coupled to the battery module.

The battery management system may be configured to control operations of the battery module when the host identifies the battery module as satisfying a condition.

The battery module may further include a memory for recording a state of the battery cell.

The battery management system may be configured to identify a type of the battery module.

Accordingly, a battery pack, a battery management system, and a battery system capable of reducing expense by selectively replacing only the component that is necessary to be replaced from among a battery module and a battery management system are provided.

BRIEF DESCRIPTION OF THE DRAWINGS

These and/or other aspects will become apparent and more readily appreciated from the following description of the embodiments, taken in conjunction with the accompanying drawings, of which.

DETAILED DESCRIPTION

As the present invention allows for various changes and numerous embodiments, particular embodiments will be illustrated in the drawings and described in detail in the written description. However, this is not intended to limit the present invention to particular modes of practice, and it will be appreciated that all changes, equivalents, and substitutes that do not depart from the spirit and technical scope of the present invention are encompassed in the present invention. In the following description of embodiments of the present invention, some of the detailed explanations of related art that may unnecessarily obscure the essence of the invention have been omitted.

The terms used in the present specification are merely used to describe particular embodiments, and are not intended to limit the present invention. An expression used in the singular encompasses the expression of the plural, unless otherwise indicated, or unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added without departing from the scope and spirit of the present invention.

Embodiments of the invention will be described below in more detail with reference to the accompanying drawings. Those components that are the same or are in correspondence are rendered the same reference numeral throughout the figures, and redundant explanations are omitted. As used herein, the term "and/or" includes any and all combinations of one or more of the associated listed items.

Figure 1:
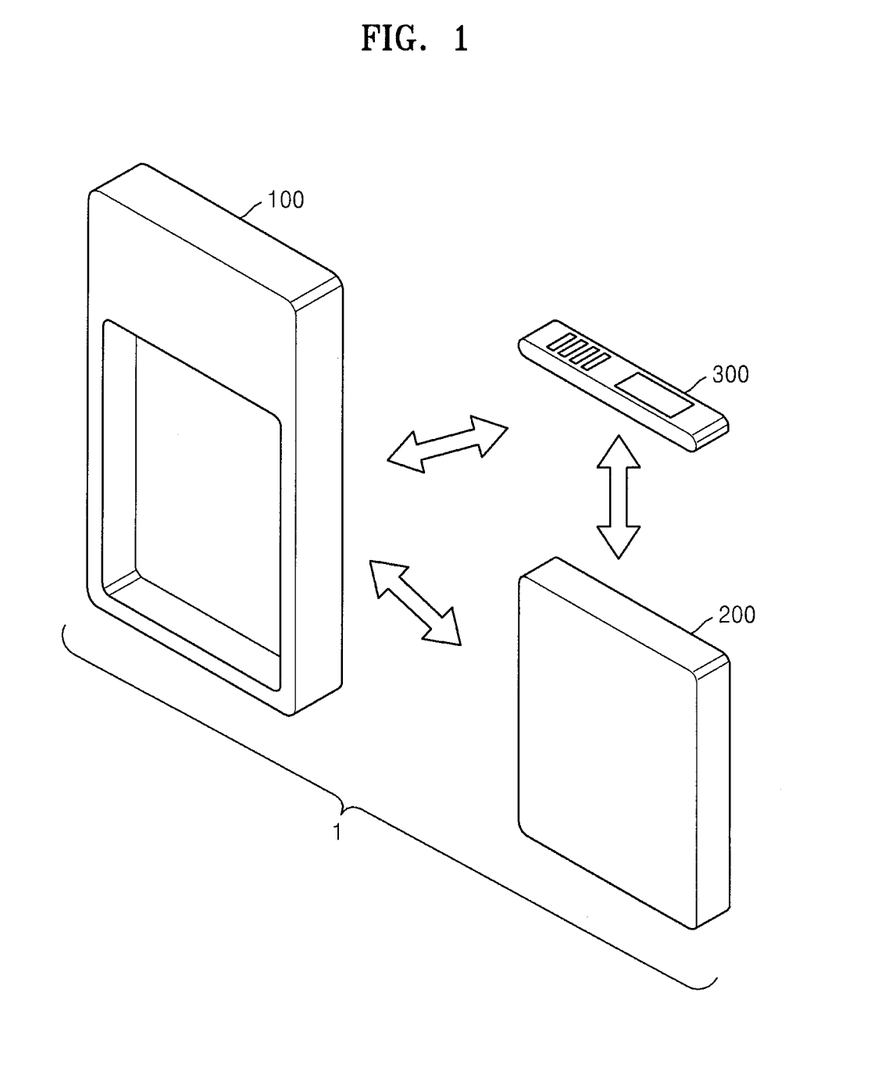
FIG. 1 is a conceptual diagram of a battery system according to an embodiment of the present invention.

FIG. 1 is a conceptual diagram of a battery system 1 according to an embodiment of the present invention. Referring to FIG. 1, the battery system 1 includes a body 100, a battery module 200, and a battery protection circuit 300.

The body 100 operates by receiving power stored in the battery module 200. Here, the body 100 may be a portable electronic device, such as a mobile phone or a laptop. A battery pack including the battery module 200 and the battery protection circuit 300 may be installed to (e.g., on, or coupled with) the body 100.

The body 100 may act as a host, and may perform authenticity certifying on the battery protection circuit 300 or on both the battery protection circuit 300 and the battery module 200. In other words, the body 100 may have an identifying function (e.g., to certify that the battery protection circuit 300 or both the battery protection circuit 300 and the battery module 200, are of a suitable type). Here, the process of authenticity certifying may denote determining whether the battery protection circuit 300 or the battery module 200 is of a suitable type (e.g., a predetermined type).

The battery module 200 of the present embodiment is a chargeable secondary battery and supplies stored power to the body 100, and is detachable from the battery protection circuit 300. The battery module 200 may have an identification function that enables its type to be recognized by the battery protection circuit 300 or the body 100.

The battery protection circuit 300 of the present embodiment controls charging and discharging operations of the battery module 200, and is detachable from the battery module 200. The battery protection circuit 300 may perform authenticity certifying on the battery module 200. In other words, the battery protection circuit 300 may have an identifying function, and may also have an identification function enabling its type to be recognized by the body 100 if the body 100 performs authenticity certifying on the battery protection circuit 300.

Various embodiments of the battery system 1 will now be described in detail.

Figure 2:
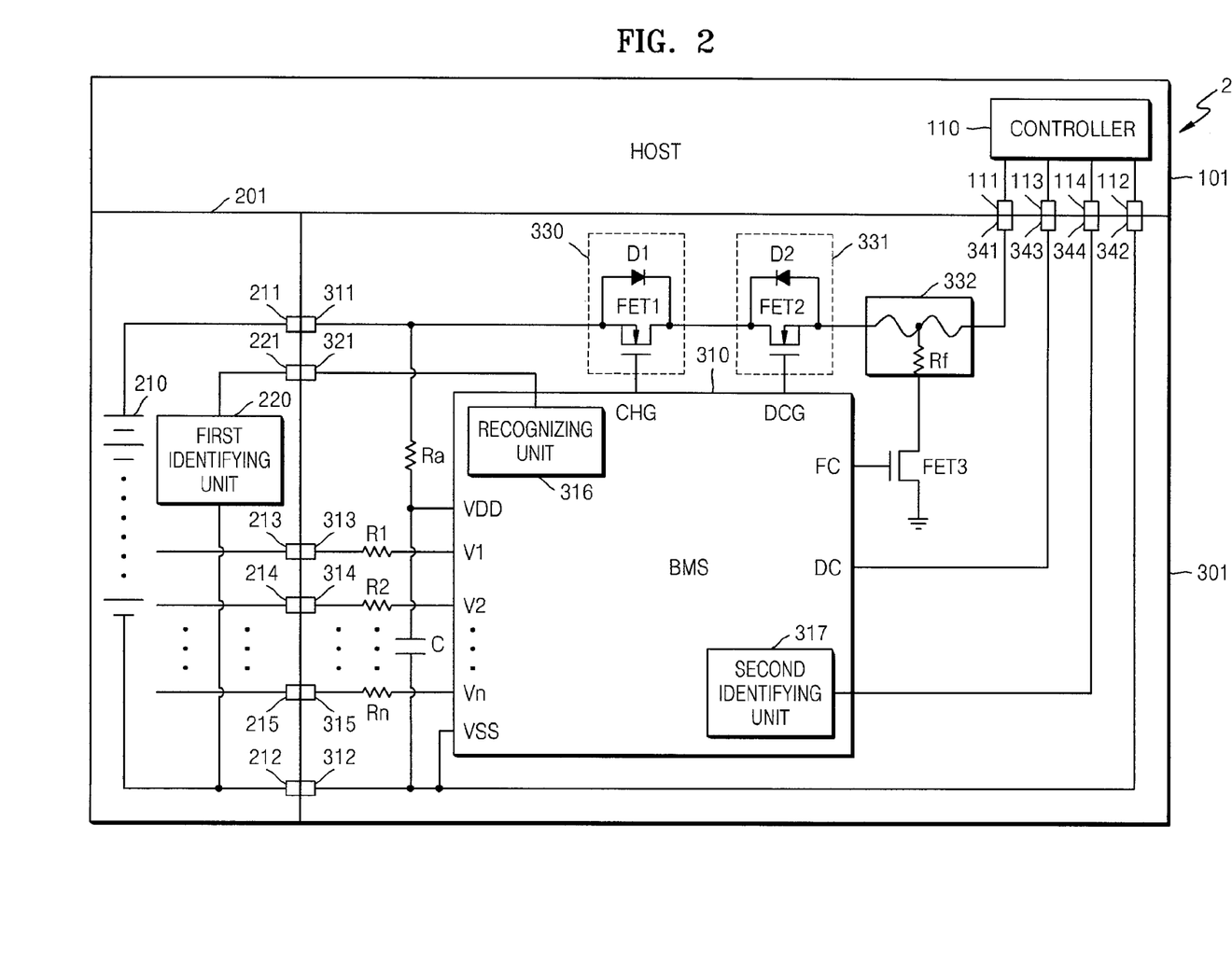
FIG. 2 is a circuit diagram of a battery system according to an embodiment of the present invention.

FIG. 2 is a circuit diagram of a battery system 2 according to an embodiment of the present invention. Referring to FIG. 2, the battery system 2 of the present embodiment includes a body 101, a battery module 201, and a battery protection circuit 301.

The body 101 includes a controller 110, and various operations are controlled by the controller 110. The body 101 is coupled to the battery protection circuit 301 via various terminals. The body 101 receives power and data from the battery protection circuit 301.

A first positive terminal 111 and a first negative terminal 112 of the body 101 are respectively coupled to a second positive terminal 341 and a second negative terminal 342 of the battery protection circuit 301 to receive power. A first communication terminal 113 of the body 101 is coupled to a second communication terminal 343 of the battery protection circuit 301 to receive data, such as data regarding a voltage, a temperature, or the like of the battery module 201.

Also, a second recognition terminal 114 of the body 101 may be coupled to a second identification terminal 344 to receive data. Accordingly, a type of the battery protection circuit 301 may be identified. Here, the type of the battery protection circuit 301 may correspond to a type of a battery management system (BMS) 310 included in the battery protection circuit 301. Here, the body 101 may communicate with the BMS 310 by using a system management bus (SM-Bus) communication protocol, but a protocol used in embodiments of the present invention is not limited thereto.

Alternatively, the body 101 according to the present embodiment may determine whether the battery protection circuit 301 or BMS 310 is a connectable type (e.g., a suitable type) according to a type of the body 101, and may start receiving power only when the battery protection circuit 301 or BMS 310 coupled thereto is the connectable type.

The battery module 201 may be installed to the body 101 as a battery pack combined with the battery protection circuit 301, and supplies stored power to the body 101. When a charger is electrically connected to the battery pack, the battery module 201 may be charged by external power.

The battery module 201 may include at least one battery cell 210, which may be, for example, a chargeable secondary battery, such as a nickel-cadmium battery, a lead storage battery, a nickel metal hydride battery (NiMH), a lithium-ion battery, or a lithium polymer battery.

The battery module 201 is coupled to the battery protection circuit 301 through various terminals. A battery positive terminal 211 and a battery negative terminal 212 of the battery module 201 are respectively coupled to a protection circuit positive terminal 311 and a protection circuit negative terminal 312 of the battery protection circuit 301, and a charging or discharging current may flow therethrough. Also, voltage output terminals 213, 214, and 215 of the battery module 201 are respectively coupled to voltage input terminals 313, 314, and 315 of the battery protection circuit 301 to allow transmission of intermediate voltages of the battery cell 210 to the BMS 310.

Also, the battery module 201 of the present embodiment includes a first identifying unit 220. The first identifying unit 220 may have an identification function enabling an external device, e.g., the BMS 301 of the battery protection circuit 301, to recognize characteristics of the battery cell 210 included in the battery module 201.

The first identifying unit 220 may be a memory for storing the characteristics of the battery cell 210. For example, the first identifying unit 220 may be a storage medium, such as, for example, an electrically erasable and programmable read only memory (EEPROM).

The first identifying unit 220 may store not only the characteristics of the battery cell 210, but may also store various information about a state of the battery cell 210 as the state changes according to use of the battery module 201, such as a number of charging and discharging times, a lifetime, a degree of deterioration, and identification (ID) of the battery cell 210. Also, the stored information may be transmitted to the BMS 310 through a first identification terminal 221. Also, the first identifying unit 220 may update stored data as directed by the BMS 310.

The battery protection circuit 301 of the present embodiment controls charging and discharging operations of the battery module 201. The battery protection circuit 301 includes the BMS 310, a charge control switch 330, a discharge control switch 331, and a fuse 332. Also, the battery protection circuit 301 may include terminals coupled to the battery module 201 and terminals for coupling to an external device or charger.

The BMS 310 performs functions such as controlling charging and discharging of the battery module 201, controlling balancing of the battery cell 210 included in the battery module 201, etc. Also, the BMS 310 monitors a voltage of the battery cell 210, a temperature, a charging current, and/or a discharging current of the battery module 201, and transmits the monitoring result to the body 101.

The BMS 310 may include a power terminal VDD to which a power supply voltage is applied, a ground terminal VSS to which a ground voltage is applied, voltage measuring terminals V1 through Vn to which intermediate voltages of the battery module 201 are applied, a charge control terminal CHG, a discharge control terminal DCG, a fuse control terminal FC, and a communication terminal DC.

When the battery module 201 or battery protection circuit 301 malfunctions, the BMS 310 generates a charge control signal for controlling operations of the charge control switch 330 or a discharge control signal for controlling operations of the discharge control switch 331. The generated charge control signal or discharge control signal are externally output through the charge control terminal CHG or discharge control terminal DCG.

In order to break the fuse 332, the BMS 310 generates a fuse break signal and applies the fuse break signal to a fuse break switch FET3. The generated fuse break signal is externally output through the fuse control terminal FC.

The voltage measuring terminals V1 through Vn of the BMS 310 of the present embodiment are respectively coupled to the voltage input terminals 313 through 315, which are respectively coupled to the voltage output terminals 213 through 215 of the battery module 201, to measure intermediate voltages of the battery module 201. Here, resistors R1 through Rn may be respectively formed between the voltage measuring terminals V1 through Vn and the voltage input terminals 313 through 315.

In FIG. 2, the BMS 310 controls all elements of the battery protection circuit 301, but the present invention is not limited thereto. For example, the battery system 2 may further include an analog front end (not shown) for monitoring a state of the battery module 201, for example, intermediate voltages or a temperature of the battery module 201, and controlling the operations of the charge control switch 330 and discharge control switch 331, and the BMS 310 may control the analog front end.

The BMS 310 according to the present embodiment may include a recognizing unit 316. The recognizing unit 316 recognizes characteristics of the battery module 201 or the characteristics of the battery cell 210 included in the battery module 201. The recognizing unit 316 is coupled to the first identifying unit 220 through a first recognition terminal 321, and may recognize the characteristics of the battery module 201 or battery cell 210 through data transmitted from the first identifying unit 220.

Also, the BMS 310 according to the present embodiment may include a second identifying unit 317. The second identifying unit 317 may have an identification function enabling an external device, e.g., the controller 110 of the body 101, to recognize a type of the battery protection circuit 301, or a type of the BMS 310 included in the battery protection circuit 301. The second identifying unit 317 may be a memory for storing the characteristics of the BMS 310.

Also, the BMS 310 according to the present embodiment may store data such as, for example, a voltage or temperature of the battery module 201 or data received from the first identifying unit 220. Also, the stored data may be updated according to use of the battery module 201. When a new battery module 201 is coupled to the battery protection circuit 301, data stored about the previous battery module 201 may be all reset.

Also, the BMS 310 according to the present embodiment may determine whether the battery cell 210 is a connectable type, and may start charging and discharging operations only when the battery module 201 coupled to the BMS 310 is the connectable type. For example, when it is determined that only a lithium-ion battery is connectable to the battery protection circuit 301, and when the battery cell 210 of the battery module 201 is an NiMH battery and the battery module 201 including the battery cell 210 is coupled to the battery protection circuit 301, the BMS 310 may recognize that the battery cell 210 included in the battery module 201 is not a lithium-ion battery and turn off the charge control switch 330 and discharge control switch 331.

Also, the BMS 310 may detect whether a battery cell 210 coupled to the battery protection circuit 301 is authentic, and may start the charging and discharging operations only when the battery cell 210 is authentic.

The charge control switch 330 blocks a charging current according to control of the BMS 310 when the battery pack malfunctions. The discharge control switch 331 blocks a discharging current according to control of the BMS 310 when the battery pack malfunctions.

The charge control switch 330 includes a field effect transistor FET1 and a parasitic diode D1. The field effect transistor FET1 limits a current flow from the second positive terminal 341 to the protection circuit positive terminal 311, or a current flow from the protection circuit negative terminal 312 to the second negative terminal 342. In other words, a charging current is blocked by using the field effect transistor FET1. Here, the field effect transistor FET1 is formed such that a discharging current flows through the parasitic diode D1.

The discharge control switch 331 includes a field effect transistor FET2 and a parasitic diode D2. The field effect transistor FET2 limits a current flow from the second negative terminal 342 to the protection circuit negative terminal 312, or the current flow from the protection circuit positive terminal 311 to the second positive terminal 341. In other words, a discharging current is blocked by using the field effect transistor FET2. Here, the field effect transistor FET2 is formed such that a charging current flows through the parasitic diode D2. A connection direction of source and drain electrodes of the field effect transistor FET2 is different from a connection direction of source and drain electrodes of the field effect transistor FET1.

The charge and discharge control switches 330 and 331 are switching devices, and are not limited to field effect transistors, but may be any device for performing a switching function.

The fuse 332 is formed on a high current path where a relatively high current flows through, and is broken when the battery pack malfunctions so that a charging or discharging current does not flow. A resistor Rf included in the fuse 332 is coupled between the high current path and the ground. When a current equal to or above a size (e.g., a predetermined size) flows through the resistor Rf, the fuse 332 melts due to heat generated in the resistor Rf, thereby blocking current flow.

The fuse 332 is coupled between the protection circuit positive terminal 311 and the second positive terminal 341 in FIG. 2, but the location of the fuse 332 is not limited thereto. For example, the fuse 332 may be coupled between the protection circuit negative terminal 312 and the second negative terminal 342.

When the battery pack malfunctions, a charging current or discharging current is first blocked by using the charging control switch 330 and/or the discharge control switch 331. However, if the battery pack still malfunctions even when the charge control switch 330 and/or the discharge control switch 331 are controlled, current flow is permanently blocked by breaking the fuse 332. In other words, the battery pack can no longer be used.

The fuse block switch FET3 breaks the fuse 332 by flowing a current through the resistor Rf included in the fuse 332. The fuse block switch FET3 is formed between the fuse 332 and the ground, and is turned on by receiving the fuse break signal from the BMS 310, thereby flowing a current through the resistor Rf. The fuse block switch FET3 may be a field effect transistor or any other switching device.

The battery protection circuit 301 may include various terminals, such as the protection circuit positive terminal 311, the protection circuit negative terminal 312, the voltage input terminals 313 through 315, the first recognition terminal 321, the second positive terminal 341, the second negative terminal 342, the second communication terminal 343, and the second identification terminal 344. Details about terminals described above will not be repeated.

The protection circuit positive terminal 311 and the protection circuit negative terminal 312 are respectively coupled to the battery positive terminal 211 and the battery negative terminal 212, and charging and discharging currents pass therethrough.

The second positive terminal 341 and the second negative terminal 342 are elements coupled to an external device. Here, the external device may be an electronic device or charger.

The second communication terminal 343 may be coupled to the first communication terminal 113 of the body 101 to transmit various types of data related to the battery module 201 or battery protection circuit 301 to the body 101.

The second identification terminal 344 may be coupled to the second recognition terminal 114 of the body 101 to transmit a signal or data for recognizing the type of the battery protection circuit 301 or BMS 310 to the body 101.

Figure 3:
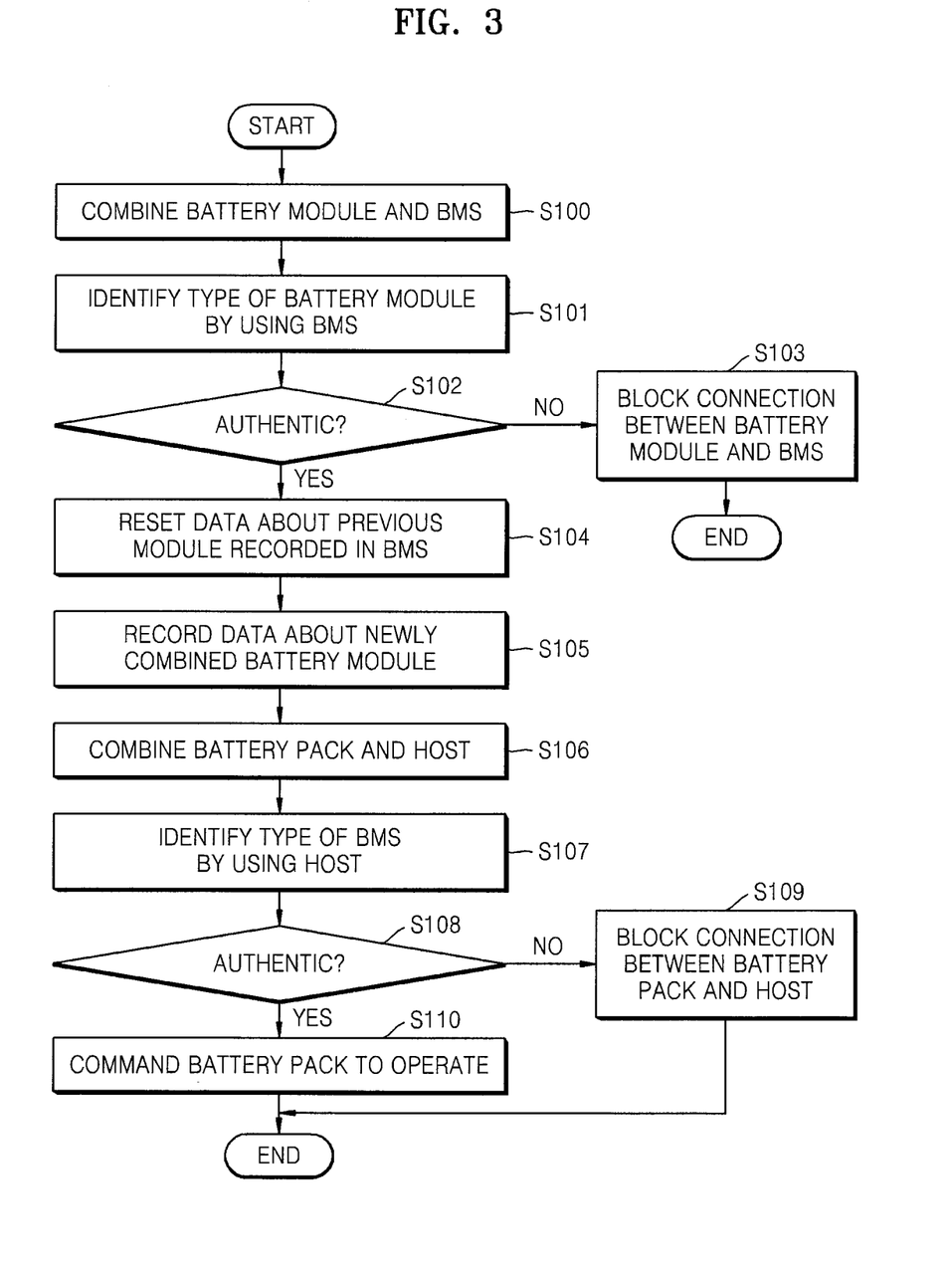
FIG. 3 is a flowchart illustrating a method of operating a battery system according to an embodiment of the present invention.

FIG. 3 is a flowchart illustrating a method of operating the battery system 2, according to an embodiment of the present invention. Referring to FIG. 3, the battery module 201 is combined with the BMS 310 in operation S100. Operation S100 may be performed to combine the battery module 201 and the battery protection circuit 301 including the BMS 310. Here, the battery pack is formed by combining the battery module 201 and the battery protection circuit 301.

The BMS 310 identifies the type and/or characteristics of the battery module 201 or the battery cell 210 included in the battery module 201 in operation S101. Also, the BMS 310 determines whether the battery module 201 or battery cell 210 is authentic or suitable (e.g., of a particular type, a compatible type, an approved type, a connectable type, or a predetermined type) in operation S102.

If the battery module 201 or battery cell 210 is not authentic or is not of the suitable type, the BMS 310 blocks a connection between the battery module 201 and the BMS 310 in operation S103. Here, the connection blocking is not limited to blocking a physical contact, but may mean turning off the charge control switch 330 or discharge control switch 331 so that a charging or discharging operation is not performed.

If the battery module 201 or battery cell 210 is authentic and/or is of the predetermined type, the BMS 310 resets data about a previous battery module 201 in operation S104. Then, the BMS 310 records data about the newly combined battery module 201 in operation S105.

Next, the battery pack including the battery module 201 and the battery protection circuit 301 is combined to the body 101 constituting a host in operation S106. The body 101 identifies the type of the BMS 310 in operation S107. Then, the body 101 determines whether the BMS 310 is authentic or is a compatible type in operation S108.

If the BMS 310 is not authentic or is not compatible, the body 101 blocks a connection between the battery pack and the body 101 in operation S109. Here, the connection blocking is not limited to blocking a physical contact, but may mean blocking a path of supplying power from the battery pack.

If the BMS 310 is authentic or is compatible, the body 101 directs the BMS 310 to start operating, thereby operating an electronic device or the like in operation S110.

Figure 4:
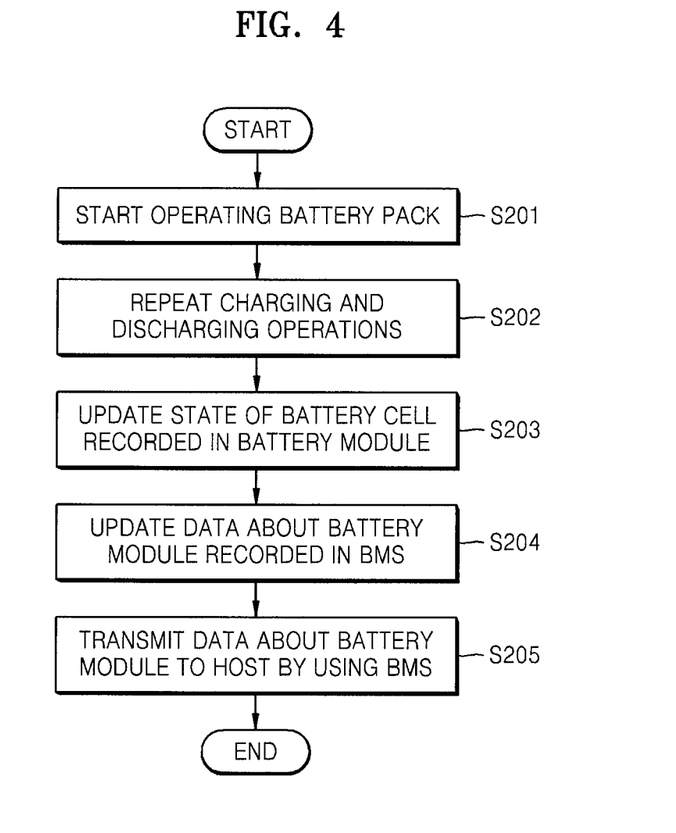
FIG. 4 is a flowchart illustrating a method of operating a battery system according to another embodiment of the present invention.

FIG. 4 is a flowchart illustrating a method of operating the battery system 2, according to another embodiment of the present invention. Referring to FIG. 4, when the battery pack is coupled to the body 101, and the body 101 determines that the BMS 310 is authentic or is of a suitable type (e.g., a predetermined type), the battery pack starts to operate in operation S201. Then, the battery module 201 of the battery pack repeats charging and discharging operations in operation S202.

A state of the battery module 201 is changed according to the charging and discharging operations, and thus, the state of the battery cell 210 is recorded and updated in the battery module 201 in operation S203.

The battery module 201 transmits recorded data to the BMS 310, and the BMS 310 updates the recorded data about the battery module 201 in operation S204.

Also, the BMS 310 may transmit the data about the battery module 201 to the body 101, which is a host, in operation S205.

As described above, the battery system 2 according to the present embodiment is capable of replacing only a malfunctioning element from among the battery module 201 and the battery protection circuit 301 without having to replace the entire battery pack, as the battery module 201 and battery protection circuit 301 are detachable from each other, and thus, maintenance costs may be reduced.

Also, the battery system 2 according to the present embodiment enables only authentic or suitable (e.g., predetermined)

elements to combine with each other by using the identification function and the recognizing function, and thus, an unusable element is not combined while individually replacing each element, and thus, the battery system 2 may stably operate.

Figure 5:
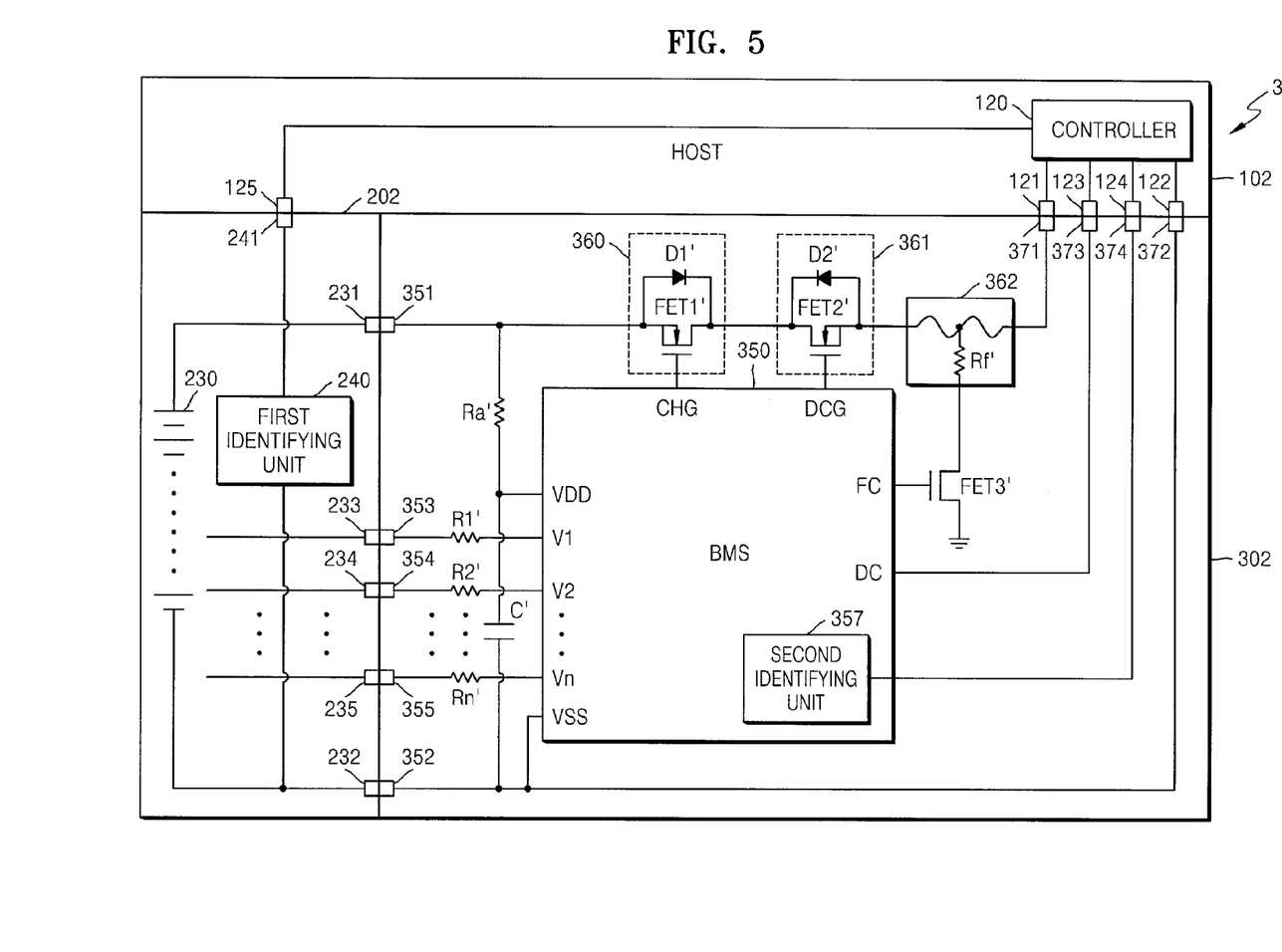
FIG. 5 is a circuit diagram of a battery system according to another embodiment of the present invention.

FIG. 5 is a circuit diagram of a battery system 3 according to another embodiment of the present invention. Since structures of the battery system 2 of FIG. 2 and the battery system 3 of FIG. 5 are similar to each other, differences therebetween will mainly be described.

Referring to FIG. 5, the battery system 3 includes a body 102, a battery module 202, and a battery protection circuit 302.

The body 102 includes a controller 120, and various operations are controlled by the controller 120. The body 102 is coupled to the battery protection circuit 302 via various terminals. The body 102 receives power and data from the battery protection circuit 302.

The body 102 according to the present embodiment may further include a third recognition terminal 125. The third recognition terminal 125 may be coupled to a first identification terminal 241 of the battery module 202 to receive data about characteristics of the battery module 202 or of a battery cell 230 included in the battery module 202 from a first identifying unit 240. Also, the controller 120 recognizes the characteristics of the battery module 202 or battery cell 230 included in the battery module 202 by using the received data.

Also, the body 102 according to the present embodiment may determine whether the battery cell 230 is a connectable/compatible type, and direct a BMS 350 to start controlling charging and discharging operations only when the battery cell 230 included in the battery module 202 coupled to the body 102 is the connectable type. For example, when it is determined that only a lithium-ion battery is connectable to the body 102, and when the battery cell 230 is a NiMH battery and the battery module 202 including the battery cell 230 is coupled to the body 102, the body 102 may recognize that the battery cell 230 included in the battery module 202 is not a lithium-ion battery, and the BMS 350 may direct a charge control switch 360 and a discharge control switch 361 to be turned off.

Also, the body 102 of the present embodiment determines whether the battery cell 230 coupled to the body 102 is authentic, and directs the BMS 350 to control the charging and discharging operations only when the battery cell 230 is authentic.

Like in the battery system 2 of FIG. 2, the body 102 may receive data through a second recognition terminal 124 coupled to a second identification terminal 374. Accordingly, a type of the battery protection circuit 302 may be identified. Also, the body 102 may determine whether the battery protection circuit 302 or BMS 350 is a connectable type according to a type of the body 102, and will start receiving power only when the battery protection circuit 302 or BMS 350 coupled thereto is the connectable type.

The battery module 202 may be installed to the body 102, as a battery pack combined with the battery protection circuit 302, and may provide stored power to the body 102. When a charger is coupled to the battery pack, the battery module 202 may be charged by external power.

The battery module 202 according to the present embodiment may include the first identifying unit 240. The first identifying unit 240 may have an identification function enabling an external device, such as the controller 120 of the body 102, to recognize the characteristics of the battery cell 230 included in the battery module 202.

The first identifying unit 240 may be a memory for storing the characteristics of battery cell 230. For example, the first identifying unit 240 may be a storage medium, such as an EEPROM.

The first identifying unit 240 may store not only the characteristics of the battery cell 230, but also various types of information about a state of the battery cell 230 as the state changes according to a number of charging and discharging times, a lifetime, a degree of deterioration, and the ID of the battery cell 230. Also, the first identifying unit 240 may transmit the stored information to the body 102 through the first identification terminal 241. Also, the first identifying unit 240 may update the stored data according to a direction of the controller 120.

The battery protection circuit 302 controls the charging and discharging operations of the battery module 202. The battery protection circuit 302 includes the BMS 350, the charge control switch 360, the discharge control switch 361, and a fuse 362. Also, the battery protection circuit 302 includes terminals coupled to the battery module 202 and terminals for coupling to an external device or charger.

The BMS 350 according to the present embodiment may include a second identifying unit 357, like the BMS 310 of the embodiment shown in FIG. 2. The second identifying unit 357 may have an identification function enabling an external device, such as the controller 120 of the body 102, to recognize the type of battery protection circuit 302 or the type of BMS 350 included in the battery protection circuit 302. The second identifying unit 357 may be a memory for storing the characteristics of the BMS 350.

Also, the BMS 350 according to the present embodiment receives a direction that determines whether the battery module 202 is to control the charging and discharging operations from the controller 120. If the battery module 202 combined to the battery protection circuit 302 is not a suitable type (e.g., a predetermined type) or is not authentic, the BMS 350 turns off both the charge control switch 360 and the discharge control switch 361 according to the direction of the controller 120 so that the charging and discharging operations are not performed. On the other hand, if the battery module 202 combined to the battery protection circuit 302 is suitable (e.g., is of the predetermined type or is authentic), then the BMS 350 turns on both the charge control switch 360 and the discharge control switch 361 according to the direction of the controller 120 so that the charging and discharging operations are performed.

Figure 6:
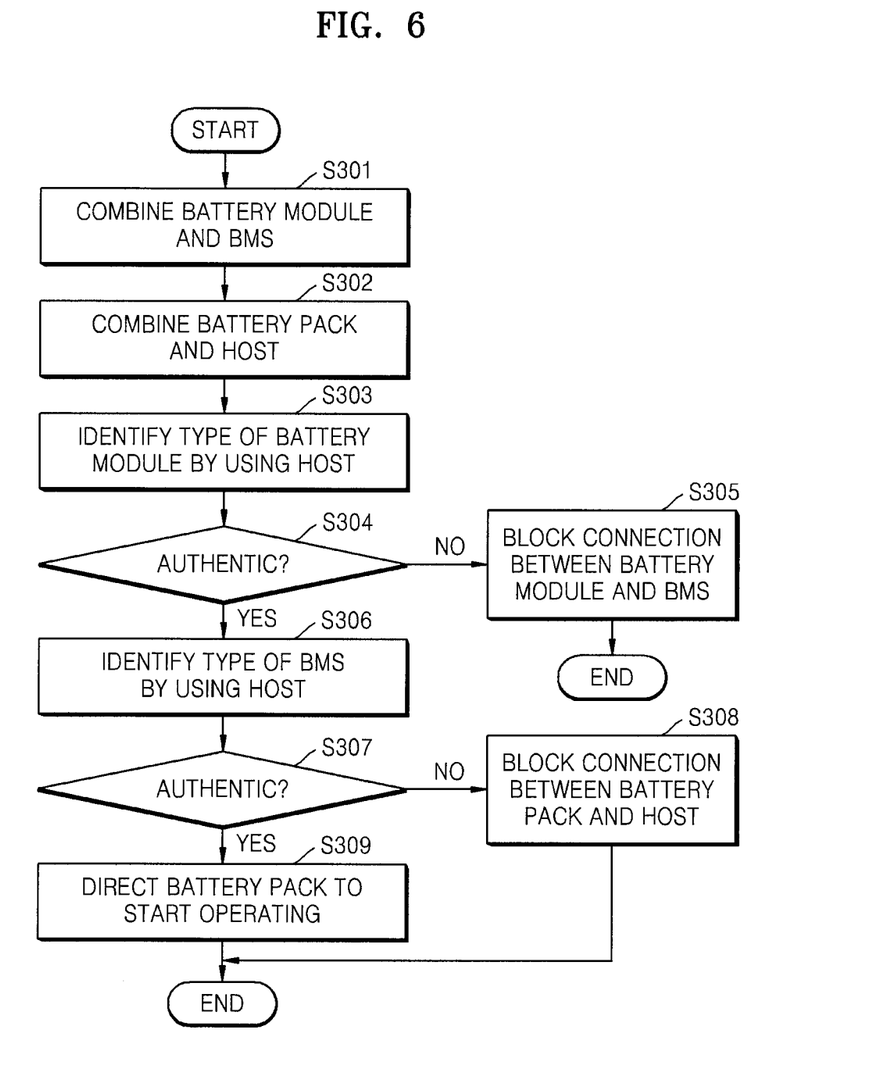
FIG. 6 is a flowchart illustrating a method of operating a battery system according to another embodiment of the present invention.

FIG. 6 is a flowchart illustrating a method of operating the battery system 3, according to another embodiment of the present invention. Referring to FIG. 6, the battery module 202 is combined with the BMS 350 in operation S301. This may have the same meaning as combining the battery module 202 to the battery protection circuit 302 including the BMS 350. Here, the battery pack is formed by combining the battery module 202 and the battery protection circuit 302. Then, the battery pack is combined to the body 102, i.e., a host, in operation S302.

The controller 120 of the body 102 identifies the type or characteristics of battery module 202 or battery cell 230 included in the battery module 202 in operation S303, and determines whether the battery module 202 or battery cell 230 is authentic or a suitable type (e.g., a predetermined type) in operation S304.

If the battery module 202 or battery cell 230 is not authentic or is not the predetermined type, the controller 120 blocks a connection between the battery module 202 and the BMS 350 in operation S305. Here, the connection blocking is not limited to blocking physical contact, but may denote turning off the charge control switch 360 and discharge control switch 361 so that charging and discharging operations are unable to be performed.

If the battery module 202 or battery cell 230 is authentic or the predetermined type, the body 102 identifies the type of the BMS 350 in operation S306, and determines whether the BMS 350 is authentic or a predetermined type in operation S307.

If the BMS 350 is not authentic or the predetermined type, the body 102 blocks a connection between the body 102 and the battery pack in operation S308. Here, the connection blocking is not limited to blocking a physical contact, but may mean blocking a path of supplying power from the battery pack.

If the BMS 350 is authentic or suitable (e.g., is the predetermined type), the body 102 directs the BMS 350 of the battery pack to start operating, and thus, an electronic device starts to operate in operation S309.

As described above, the battery system 3 according to the present embodiment is configured such that the battery module 202 and the battery protection circuit 302 are detachable from each other, and thus, only an element that malfunctions is replaced without having to replace the entire battery pack. Accordingly, maintenance expenses are reduced.

Also, since the battery system 3 according to the present embodiment enables only authentic or suitable elements (e.g., predetermined elements) to combine with each other by using an identification function or identifying function, an unusable or undesired element is prevented from being combined while individually replacing each element. Thus, the battery system 3 stably operates.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not have been described in detail. Furthermore, the connecting lines, or connectors shown in the various figures are intended to represent exemplary functional relationships and/or physical or logical couplings between the various elements. It should be noted that many alternative or additional functional relationships, physical connections or logical connections may be present in a practical device of embodiments of the present invention. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the present invention.

Furthermore, although the present invention has been particularly shown and described with reference to exemplary embodiments thereof, it will be understood by those of ordinary skill in the art that features of different embodiments may be combined to form further embodiments, and that various changes, modifications and adaptations in form and details of the invention are possible without departure from the spirit and scope of the invention. Thus the present invention has been described by way of illustration and not limitation, and is defined by the following claims and their equivalents.

What is claimed is:

1. A battery pack comprising:
a battery module comprising a battery cell and configured to perform a first identification function for enabling a device outside the battery module to recognize characteristics of the battery cell; and
a battery management system for controlling operations of the battery cell and configured to perform a second identification function for enabling a device outside the battery management system to recognize a type of the battery management system, the battery management system being coupled between the battery module and the device outside the battery management system and being detachable from the battery module.

2. The battery pack of claim 1, wherein the battery management system is configured to recognize the characteristics of the battery cell by using the first identification function of the battery module.

3. The battery pack of claim 1, wherein the battery module further comprises an identifying unit configured to perform the first identification function.

4. The battery pack of claim 3, wherein the identifying unit is a memory for recording a state of the battery cell.

5. The battery pack of claim 4, wherein the battery management system is configured to reset data about a previous battery module when the battery module is installed.

6. The battery pack of claim 4, wherein the battery management system is configured to update the state of the battery cell recorded by the memory.

7. The battery pack of claim 1, wherein whether battery cells are connectable to the battery management system is determined according to their characteristics and according to the type of the battery management system.

8. The battery pack of claim 1, wherein the device outside the battery module is electrically coupled to the battery pack.

9. A battery management system for controlling operations of a battery module comprising a battery cell, wherein the battery management system is configured to perform an identification function for enabling an external device to which the battery management system is coupled to recognize a type of the battery management system, wherein the battery management system is configured to be coupled between the battery module and the external device and is configured to be detachable from the battery module.

10. The battery management system of claim 9, further comprising an identifying unit for performing the identification function and for communicating with the external device.

11. The battery management system of claim 9, wherein whether the battery module is connectable to the battery management system is determined according to its characteristics.

12. The battery management system of claim 11, further comprising a recognizing unit for recognizing the characteristics of the battery module.

13. A battery system comprising:
a battery module comprising a battery cell;

a battery management system for controlling operations of the battery cell; and a host for identifying a type of the battery management system by being coupled to the battery management system, the battery management system being coupled between the host and the battery module and being detachable from the battery module.

14. The battery system of claim 13, wherein whether the battery management system is connectable to the host is determined according to the type of the battery management system and according to a type of the host.

15. The battery system of claim 13, wherein the host is configured to identify a type of the battery module by being coupled to the battery module.

16. The battery system of claim 15, wherein the battery management system is configured to control operations of the battery module when the host identifies the battery module as satisfying a condition.

17. The battery system of claim 13, wherein the battery module further comprises a memory for recording a state of the battery cell.

18. The battery system of claim 13, wherein the battery management system is configured to identify a type of the battery module.

* * * * *